United States Patent
Eckhardt et al.

(10) Patent No.: US 8,440,132 B2
(45) Date of Patent: May 14, 2013

(54) METHOD FOR THE PRODUCTION OF HOLLOW BODIES FROM THERMOPLASTIC PLASTIC

(75) Inventors: Joachim Eckhardt, Bonn (DE); Matthias Franke-Maintz, Hennef (DE); Gerd Wolter, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 277 days.

(21) Appl. No.: 12/665,827

(22) PCT Filed: May 7, 2008

(86) PCT No.: PCT/EP2008/003633
§ 371 (c)(1),
(2), (4) Date: Jul. 16, 2010

(87) PCT Pub. No.: WO2008/154988
PCT Pub. Date: Dec. 24, 2008

(65) Prior Publication Data
US 2010/0282759 A1    Nov. 11, 2010

(30) Foreign Application Priority Data
Jun. 20, 2007   (DE) .................. 10 2007 028 881

(51) Int. Cl.
*B29C 49/04*    (2006.01)
(52) U.S. Cl.
USPC .......................................... 264/545; 264/540
(58) Field of Classification Search ............. 264/545
See application file for complete search history.

(56) References Cited

U.S. PATENT DOCUMENTS

| | | | |
|---|---|---|---|
| 1,410,215 A | 3/1922 | Neuland | |
| 6,403,936 B2* | 6/2002 | Cochran et al. | 219/633 |
| 6,969,485 B2* | 11/2005 | Vorenkamp et al. | 264/545 |
| 7,175,791 B2 | 2/2007 | Pappert et al. | |
| 2009/0250846 A1* | 10/2009 | Criel et al. | 264/511 |

FOREIGN PATENT DOCUMENTS

| | | |
|---|---|---|
| DE | 20 2006 013 751 | 11/2006 |
| EP | 1 334 817 | 8/2003 |
| GB | 1410215 | 10/1975 |
| JP | 48062858 | 9/1973 |

(Continued)

OTHER PUBLICATIONS

English language translation of Japanese Office Action dated Oct. 5, 2011, received in corresponding JP Application No. 2010-512538.
International Search Report dated Sep. 3, 2008, received in corresponding PCT Application No. PCT/EP2008/003633.

(Continued)

*Primary Examiner* — Monica A Huson
(74) *Attorney, Agent, or Firm* — Grossman Tucker Perreault & Pfleger, PLLC

(57) ABSTRACT

The invention relates to a method for the production of hollow bodies from thermoplastic plastic. The method comprises the extrusion of at least two sheet-like preforms consisting of thermoplastic plastic, the introduction of the preforms into a preferably multipart molding die with a molding cavity which at least partially defines the contour of the hollow body to be manufactured, and the shaping of the preforms inside the die, using a vacuum and/or gas pressure in the first heat of the material. The method is distinguished in that at least two preforms to be shaped into a hollow body and to be connected are extruded successively, that is to say sequentially, in time and are shaped simultaneously.

11 Claims, 3 Drawing Sheets

FOREIGN PATENT DOCUMENTS

Figure 1:
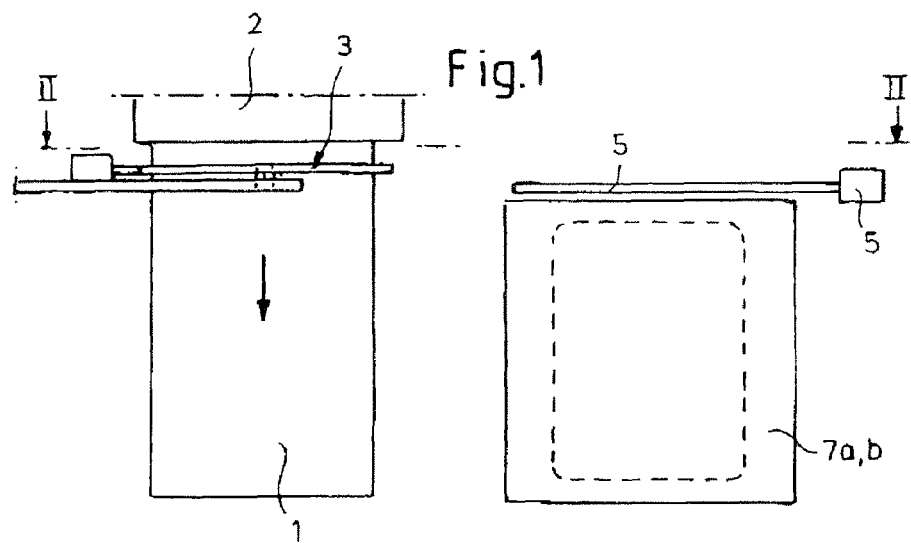

| | | |
|---|---|---|
| JP | 60125633 | 7/1985 |
| JP | 60141521 | 7/1985 |
| JP | 04270627 | 9/1992 |
| JP | 09001640 | 1/1997 |
| JP | 2004202791 | 7/2004 |
| WO | 2006/064057 | 6/2006 |

OTHER PUBLICATIONS

Translation of International Preliminary Report on Patentability dated Jan. 12, 2010, received in corresponding PCT Application No. PCT/EP2008/003633.

* cited by examiner

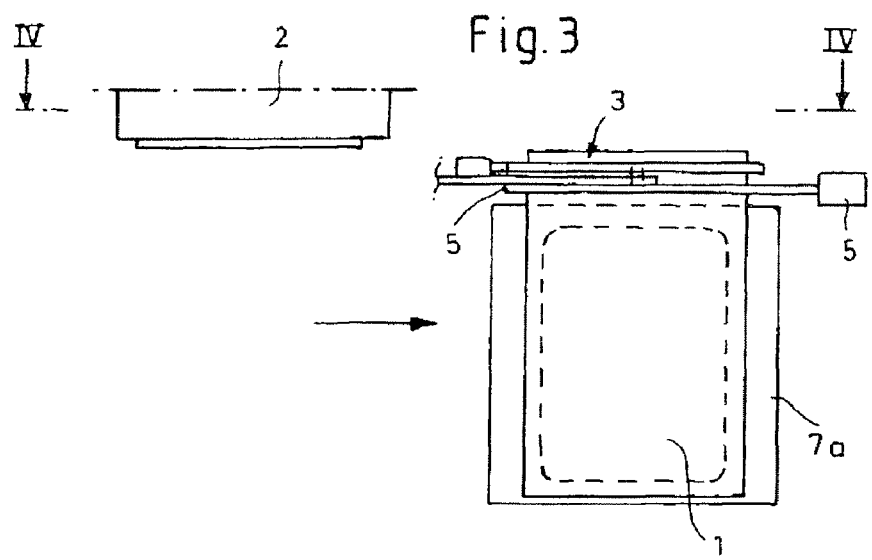
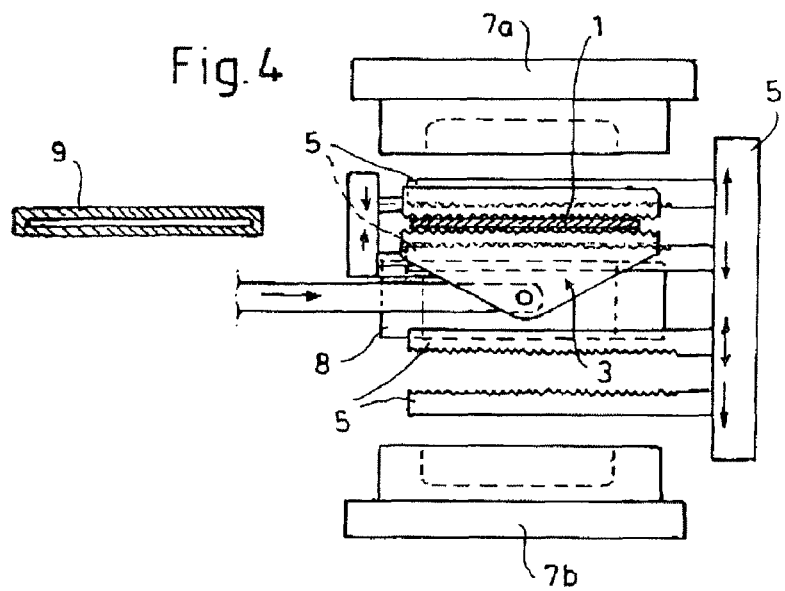

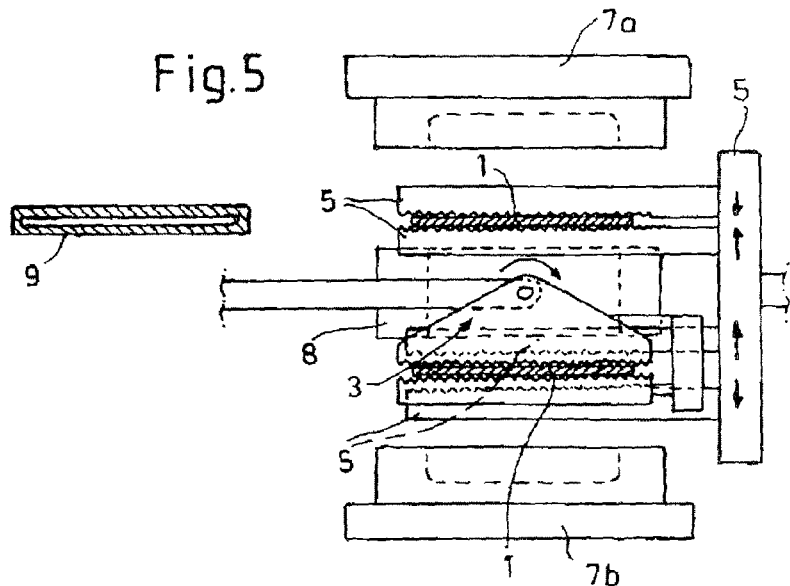
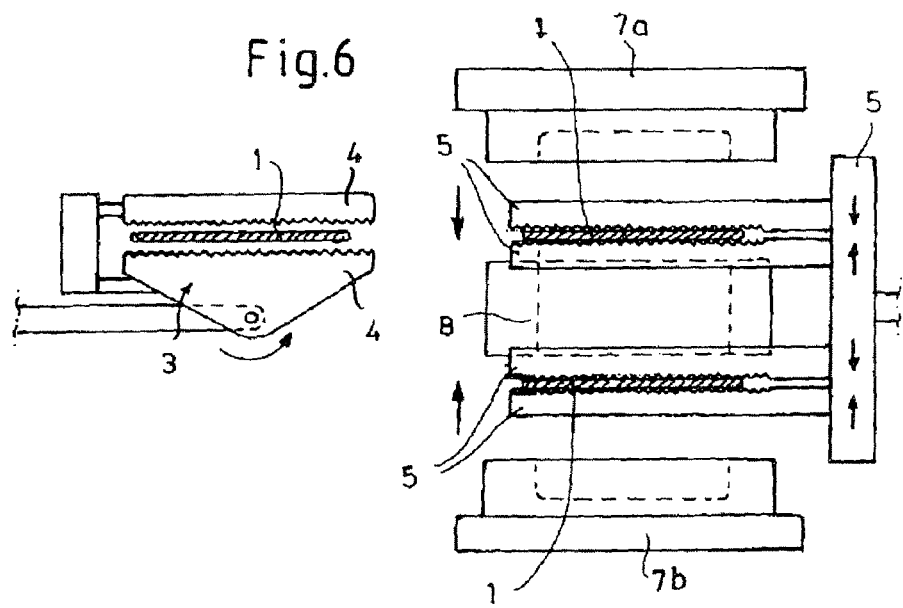

METHOD FOR THE PRODUCTION OF HOLLOW BODIES FROM THERMOPLASTIC PLASTIC

The invention relates to a method for the production of hollow bodies from thermoplastic plastic, comprising the extrusion of at least two sheet-like preforms consisting of thermoplastic plastic, the introduction of the preforms into a molding die with a molding cavity which at least partially defines the contour of the hollow body to be manufactured, and the shaping of the preforms inside the die, using a vacuum and/or gas pressure in the first heat of the material.

The invention relates, furthermore, to a device for performing the method and to a fuel container consisting of thermoplastic plastic which has been obtained by the extrusion blow molding of two sheet-like preforms consisting of thermoplastic plastic.

A method for the production of hollow bodies from thermoplastic plastic, in particular for the production of fuel containers from thermoplastic plastic, in which sheet-like preforms are extruded and in the first heat are shaped in a multipart blow molding die into a closed container, is basically known. For example, German Utility Model 20 2006 013 751 discloses a device for performing such a method, in which, first, thermoplastic material is plasticized in a known way in an extruder and is shaped inside an extrusion head into a tubular melt extrusion. By means of an adapter, the tubular melt extrusion is shaped into two sheet-like melt extrusions. These sheet-like preforms are extruded in parallel from two sheet dies of the extrusion head which are arranged next to one another. The sheet-like preforms are then shaped in a multipart die, comprising two outer molds and one center mold, into a plastic container composed of two half shells. By means of the adjustment of the die gap of the sheet dies, each preform is given a wall thickness profile which, on the one hand, allows for the fact that the article is to have regions of different wall thickness and, on the other hand, allows for the fact that, depending on the configuration of the container to be produced, the thermoplastic material is stretched or elongated (extended) in regions to a greater or lesser extent inside the molding die. In order to avoid material accumulations or undesirable material thinnings occurring as a result of this, it is known to vary the thickness of the preforms over their length and also transversely thereto.

Wall thickness control during extrusion is also sufficiently known, for example, in the production of tubular preforms.

Conventionally, in extrusion blow molding, the extrusion of the preforms takes place in a hanging manner, that is to say in the direction of gravity, the result of which, depending on the mass distribution of the preforms, may be that these experience during extrusion a different elongation which is due to the weight of the extruded mass. The mass flow of plasticized plastic which is available during extrusion is usually constant and is divided uniformly inside the extrusion head and delivered to the outlet gaps of the two dies. Different material distributions between the two preforms due to the variation in wall thickness may lead to considerable length differences in the preforms, and this sometimes presents problems. Inter alia, it is also necessary to ensure that the wall thickness distribution of the preform is selected such that in each case thicker and/or thinner regions of the preform are placed at the corresponding location in the molding die.

Such a procedure described above has the disadvantage, furthermore, that the cycle time of the method is governed, overall, by the extrusion time of that preform which has the greatest wall thickness. It is precisely the optimization of cycle times during the production of extrusion blow-molded components which constitutes an appreciable efficiency factor.

The object on which the invention is based, therefore, is to provide a method which avoids the disadvantages outlined above.

The object is achieved, according to the invention, by means of a method for the production of thermoplastic hollow bodies from thermoplastic plastic, comprising the extrusion of at least two sheet-like preforms consisting of thermoplastic plastic, the introduction of the preforms into a molding die with a molding cavity which at least partially defines the contour of the hollow body to be manufactured, and the shaping of the preforms inside the die, using a vacuum and/or gas pressure in the first heat of the material, the method being distinguished in that at least two preforms to be shaped into a hollow body and to be connected are extruded successively (sequentially) in time and shaped simultaneously.

The expression "in the first heat of the material" signifies, within the meaning of the invention, that the preforms are processed further into the finished article without a further supply of heat.

The method according to the invention has various advantages, as compared with the methods customary hitherto in the prior art. The preforms can be extruded with a greatly different mass distribution, without the material distribution and the melt flow of the other preform having to be taken into account in the construction of a preform. This method makes it possible to save plastic material, in that each preform sheet can be extruded individually in terms of an optimal wall thickness distribution. As a result, with a constant throughput or with a constant conveying capacity of the extruders, each sheet can be optimized individually. It is in this case particularly advantageous that a different extrusion time can be taken up for each preform sheet, which in process engineering terms is not possible in the parallel extrusion of a plurality of sheets.

The problem of the different elongation of the preform sheets due to different mass distributions is consequently also taken into account in a special way.

According to a preferred variant of the method, the use of an extrusion head with a single sheet die, the die gap of which is adjustable for the purpose of wall thickness control, is provided.

Thus, it would be conceivable to use two extrusion heads, each with two sheet dies, for the method. In this case, the two extrusion heads may provide preforms for two molding dies which are operated in parallel. In the meaning of the invention, in each case two identical preforms are produced by means of one extrusion head, specifically for two molding dies.

Preferably, the preforms are each given a wall thickness profile over their length and/or width.

In a variant of the method, there is provision whereby a first preform and a second preform, which are extruded directly in succession, are extruded in each case with wall thicknesses and/or weights different from one another.

In one variant of the method, the preforms, after being extruded to a predetermined length, are removed by means of one or more gripping devices on the extrusion head and are introduced into the molding die by means of the gripping devices.

Alternatively, it is possible to move the extrusion head with respect to the molding die and/or the molding die with respect to the extrusion head.

In a preferred variant of the invention, there is provision for the use of a three-part blow molding die by means of which the preforms are in each case shaped into half shells which, in a further processing step, are connected to one another to form an essentially closed hollow body.

In this variant of the method, the blow molding die may comprise two outer molds and one center mold, the outer molds in each case forming part cavities for shaping one half shell of a container. The center mold may, for example, comprise or surround retractable and extendable component holders, by means of which fitting parts can be introduced into the half shells during the shaping of these.

In this method, there is provision whereby, first, the preforms are in each case placed between the center mold and an outer mold, and the center mold and the outer mold are then closed with respect to one another, so that a closed molding cavity is obtained. Then, either a vacuum is applied in the outer molds and/or the cavity is put under gas pressure by means of known blow pins, thus resulting in an expansion of the preforms inside the part cavities and a laying of the preforms against the contour predetermined by the part cavities. Simultaneously or in a further method step, the fittings required inside the container can be placed, via component holders arranged in the center mold, on the inner wall of the container to be manufactured. Then, the parts of the die open, the center mold is moved transversely with respect to the outer molds, and the outer molds close with respect to one another, so that the two half shells of the article to be manufactured which are located in the outer molds are welded to one another at margins running around in a flange-like manner. The outer molds open and the finished article can be removed.

A fuel container for a motor vehicle is preferably produced by means of such a method.

In a variant of the method, there is provision whereby two preforms are placed in or introduced into the molding die such that their wide sides corresponding to one another face away from one another.

For this purpose, expediently, there is provision whereby one of the preforms extruded in succession is rotated through 180° about its longitudinal axis.

Such a procedure would be advantageous, for example, when the plastic container is to have a multilayer wall structure or the extrudate is in the form of a multi layer coextrudate. Where layers of different thickness are concerned, the position of the layers within the coextrudate may then sometimes be important.

Particularly in the production of fuel containers, it is customary, for example, for the fuel container to have an externally colored (carbon black-filled) polyethylene layer, whereas the inner layer consists of pure polyethylene. In such an arrangement, the layer position with respect to the enclosed cavity is important.

It may also be expedient to rotate one of the preforms extruded in succession through 180° about its transverse axis, for example when a horizontal arrangement of the molding dies is provided.

It is particularly advantageous if first a preform having a greater wall thickness and then a preform having a smaller wall thickness are extruded and are then processed into an article. For this purpose, the overall cycle time of the operation can be influenced in a particularly beneficial way. The thicker preform having the greater mass naturally cools down more slowly, whereas the preform having the smaller wall thickness is extruded more quickly, so that, overall, in such a wall thickness distribution sequential extrusion is more beneficial both thermally and in terms of the cycle time required.

Preferably, first a first preform and then the second preform are introduced into the molding die, joint shaping taking place in a further processing step. This may take place such that the preform is removed from the extrusion head by means of the die and then has to be movable into a plurality of positions with respect to the extrusion head. Alternatively, this may take place by means of a gripping device which, for example, removes the first preform on the extrusion head and moves between the center mold and an open outer mold. The outer mold may be moved with respect to the center mold, so that the first preform is held in the molding die while the second preform is being extruded. An expansion of the preforms in the molding die would then occur after the second preform has been introduced into the die.

Alternatively, the shaping of the preforms in a die may also take place successively in time.

Alternatively, a gripping device may remove the first preform on the extrusion head and move it into a standby position, while the second preform is being extruded. The second preform would then be removed by means of a gripping device, and the two gripping devices would introduce the preforms into the die synchronously.

Alternatively, the use of a double gripper would be possible.

When gripping devices are used, the most diverse possible variants may be envisaged, for example freely programmable handling or robot devices articulatable about three axes may be employed.

The object is achieved, furthermore, by means of a device for performing the method described above, comprising at least one extruder and at least one extrusion head with a die gap designed as a sheet die, the extrusion head having at least one melt duct arranged on a segment of an arc of a circle or on an arc of a circle and designed as an annular gap. The device is distinguished in that means for spreading a melt stream in the form of an arc of a circle into a single sheet-like melt stream are provided.

Finally, the object is achieved by means of a fuel container consisting of thermoplastic plastic which has been obtained by the extrusion blow molding of two sheet-like preforms consisting of thermoplastic plastic. The fuel container is distinguished in that the preforms have been assembled from two successive portions of a single melt extrusion.

The fuel container according to the invention preferably consists of an overall six-layer coextrudate with barrier layers for hydrocarbons. Such barrier layers may consist, for example, of EVOH (ethylene vinyl alcohol). The layer structure preferably comprises an outer carbon black-filled polyethylene layer, a layer of recyclate (regrind), an adhesion promoter layer, a barrier layer, a further adhesion promoter layer and a layer of pure polyethylene.

This fuel container is preferably produced in a three-part molding die with one center mold and two outer molds. Preferably, the preforms required for this purpose are extruded sequentially from an extrusion head with a sheet die, first a preform of greater wall thickness being extruded which forms the underside of the fuel container. Subsequently, a preform of smaller wall thickness is extruded which forms the top side of the fuel container. One of the two preforms, after its extrusion, is rotated through 180° about its longitudinal axis which extends in the direction of weight. The preforms are then introduced with this orientation into the molding die jointly or in succession.

Figure 2:
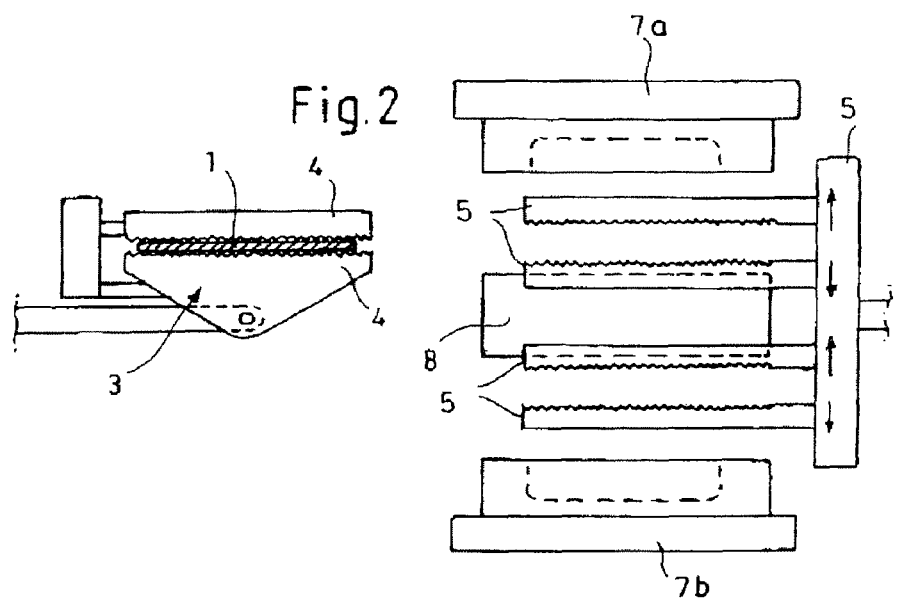

The invention is explained below by means of an exemplary embodiment roughly outlined in the drawings in which:

FIG. 1 shows a diagrammatic side view of an arrangement for performing the method according to the invention, FIG. 2 shows a section along the lines II-II in FIG. 1, FIG. 3 shows the transfer of a first preform from a first to a second gripping device, FIG. 4 shows a sectional view along the lines IV-IV in FIG. 3, FIG. 5 shows the transfer of a second preform to the second gripping device, and FIG. 6 shows a view corresponding to FIG. 5, the first gripping device being in the initial position below the extrusion head.

As already described above, the method first provides extrusion of a first preform 1 by means of an extrusion head 2 which is provided with a sheet die 9.

As illustrated diagrammatically in FIG. 1, for handling the preform 1 a first gripping device 3 is provided which clamps the preform between movable gripping jaws 4 and removes it on the extrusion head 2.

In order to make it easier to remove the preform 1 on the extrusion head 2, a separating device, not illustrated, may be provided. Alternatively, it is possible to extrude a thin place which forms a predetermined breaking line, so that the gripping device 3 can break off the preform 1 on the extrusion head 2.

The gripping device 3 is movable at least transversely with respect to the extrusion direction, and the gripping jaws 4 are pivotable about a longitudinal axis defined by the extrusion direction.

After the first gripping device 3 has removed the first preform 1 on the extrusion head 2, the gripping jaws 4 are moved away under the extrusion head 2 transversely with respect to the extrusion direction, and in this case they pivot through 180° about the longitudinal axis.

As illustrated in FIG. 3, the first gripping device 3 transfers the first preform 1 to a second gripping device 5 which is designed as a double gripper in the variant illustrated in the figures. The first gripping device 3 then moves back under the extrusion head 2 again and takes over a second preform 1. This preform is removed from the extrusion head 2 in a known way. The first gripping device 3 moves away under the extrusion head 2 and transfers the second preform 1 to the second gripping device 5 which is in a standby position.

The second gripping device 5 then moves the preforms 1 received by it between the open parts of the molding die 6 illustrated in FIG. 3.

In the drawing, the second gripping device 5 is arranged above the molding die 6, but the invention is to be understood such that the second gripping device 5 can be movable with respect to the molding die 6.

The molding die 6 comprises two outer molds 7a, b and one center mold 8, as mentioned above.

In the variant of the method according to the invention shown, the two preforms 1 are in each case brought simultaneously between the open outer molds 7a, b and the center mold 8 by means of the second gripping device 5.

The second gripping device 5 is designed such that the pairs of gripping jaws of the gripping device are in each case at a dynamically variable distance from one another, so that it is possible to adapt the distance of the preforms 1 from one another between the parts of the molding die 6. Adaptation to the particular conditions of the molding die 6 is thus possible.

In a further method step, the outer molds 7a, b close with respect to the center mold 8 in the direction of the arrows depicted in FIG. 3. When the molding die 6 is closed, the preforms are shaped in the form of part cavities provided in the outer molds 7a, b. Fitting parts are placed via the center mold 8 in the wall of the article to be manufactured.

After the shaping of the half shells of the container, the outer molds 7a, b open with respect to the center mold 8. The center mold is moved between the outer molds 7a, b transversely with respect to the opening and closing movement of the latter, so that, in a further method step, the outer molds 7a, b can close with respect to one another. The half shells of the container to be manufactured are in this case welded to one another. Finally, the outer molds 7a, b are opened again. The finished article can be removed.

List of Reference Symbols

1 Preform
2 Extrusion head
3 First gripping device
4 Gripping jaws
5 Second gripping device
6 Molding die
7a, b Outer molds
8 Center mold
9 Sheet die

What is claimed is:

1. A method for production of a hollow body from thermoplastic plastic, comprising extrusion of at least two sheet preforms of the thermoplastic plastic, introduction of the preforms into a molding die with a molding cavity which at least partially defines a contour of the hollow body to be manufactured, and a shaping of the preforms inside the molding die, using a vacuum and/or gas pressure in a first heat of the thermoplastic material, characterized in that the at least two preforms to be shaped into the hollow body and to be connected are extruded successively in time and are shaped simultaneously;

characterized by extruding the at least two preforms from a same die gap;

characterized in that the at least two sheet preforms are placed in or introduced into the molding die such that wide sides of the preforms corresponding to one another face away from one another; and characterized in that one of the at least two sheet preforms extruded in succession is rotated through 180° about its longitudinal axis.

2. The method as claimed in claim 1, characterized by the die gap being adjustable to control a wall thickness of the preforms.

3. The method as claimed in claim 1, characterized in that each of the at least two sheet preforms has a wall thickness profile which differs over their length and/or width.

4. The method as claimed in claim 1, characterized in that the at least two sheet preforms comprise a first preform and a second preform, which are extruded directly in succession, and are each extruded with a wall thickness and/or a weight different from one another.

5. The method as claimed in claim 1, characterized in that the at least two sheet preforms, after being extruded to a predetermined length, are removed by means of one or more gripping devices on the extrusion head and are introduced into the molding die by means of the gripping devices.

6. The method as claimed in claim 1, characterized by the molding die comprising a three-part blow molding die in which the at least two sheet preforms are shaped into half shells which are then connected to one another to form the hollow body.

7. The method as claimed in claim 1 characterized in that the hollow body is a fuel container for a motor vehicle.

8. The method as claimed in claim 1, characterized in that the at least two sheet preforms comprise a first preform having a greater wall thickness and a second preform having a smaller wall thickness which are extruded and are then processed into the hollow body.

9. The method as claimed in claim 1, characterized in that the at least two sheet preforms comprise a first preform and a second preform which are introduced successively into the molding die.

10. The method as claimed in claim 1, characterized in that the at least two sheet preforms comprise a first preform which is brought into a standby position while a second preform is being extruded, and in that the first and second preforms are then introduced jointly into the molding die.

11. The method as claimed in claim 1, comprising a device for production of the hollow body, the device comprising at least one extruder and at least one extrusion head with the die gap designed as a sheet die, the extrusion head having at least one melt duct arranged on a segment of an arc of a circle or on an arc of a circle and designed as an annular gap, characterized by means for spreading a melt stream in the form of an arc of a circle into a single sheet melt stream.

* * * * *